F. M. RUSCHHAUPT.
Beer Preserver.
No. 34,695.  Patented March 18, 1862.
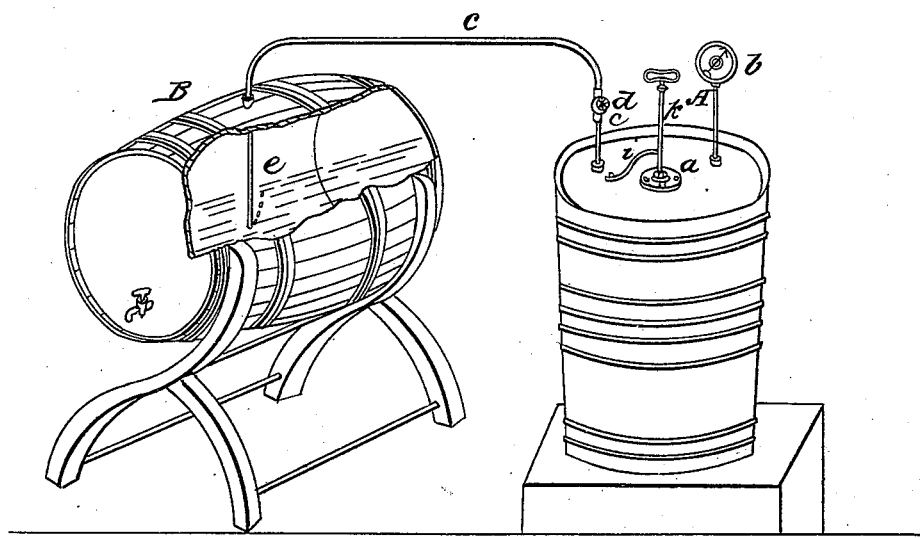
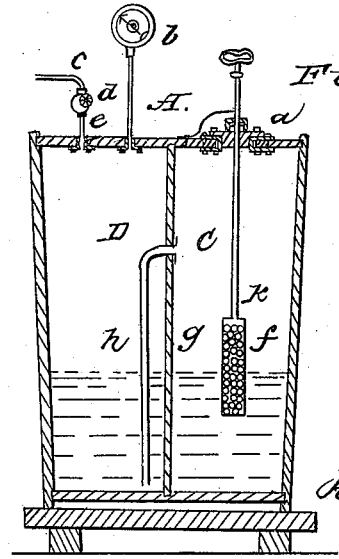

UNITED STATES PATENT OFFICE.

FREDERIC M. RUSCHHAUPT, OF NEW YORK, N. Y.

IMPROVED APPARATUS FOR PREVENTING MALT LIQUORS FROM BECOMING FLAT.

Specification forming part of Letters Patent No. 34,695, dated March 18, 1862.

*To all whom it may concern:*

Be it known that I, FREDERIC M. RUSCHHAUPT, of the city, county, and State of New York, have invented an Improved Mode to Prevent the Various Kinds of Beer, particularly Lager-Beer, from Becoming Flat, (Stale;) and I do hereby declare that the following is a full and exact description thereof, reference being had to the accompanying drawings, forming a part of this specification, in which—

Figure 1 represents a perspective view of my invention. Fig. 2 is a longitudinal vertical section of the same.

Similar letters of reference in both figures indicate corresponding parts.

The nature of my invention consists in bringing or pressing pure carbonic-acid gas into the vessel containing beer and into the liquid itself in an improved mode, which I will describe. By doing so I have, first, a pressure in the vessel which will drive the beer out of the cock as required. It therefore will not be necessary to open or lift the bung in order to use the atmosphere for the said purpose, and, second, I always have such an amount of carbonic acid that the beer will get and still possess the necessary refreshing taste, as it is well known that this taste is due to beer only when containing carbonic acid. Beer which loses its carbonic acid or refreshing property can be brought to this state or property again by introducing or pressing carbonic-acid gas into the same, as I have proved by many experiments.

I am aware that malt liquors, &c., have been, therefore, charged with carbonic-acid gas by means of force-pumps driven by any power. I am also aware that malt liquors are preserved by putting the same into strong iron or other metallic vessels and charged with carbonic-acid gas; but these methods require expensive arrangements and machinery. They are complicated and therefore impracticable. This may be the reason why such described methods (see the English patent of W. Aitken, March 30, 1830, and the English patent of John Bethel, August 21, 1848, &c.,) did not come into public use. To overcome these difficulties is the object of my invention, which I will now proceed to describe with reference to the accompanying drawings.

A is a wooden vessel about two and a quarter feet high, sixteen inches of diameter on top, and fourteen inches on the bottom. The walls are about five-fourths of an inch thick. This vessel is, by a partition $g$, divided into two parts or chambers. The partition is fixed in the walls of the vessel as tight as possible, which may be easily done by using india-rubber or gutta-percha cement. Both parts or chambers are covered inside with sheet-lead or gutta-percha or any other applicable gum, in order to make the vessel air-tight and to resist muriatic or sulphuric acid. The chamber C is partly filled with muriatic or sulphuric acid diluted with twice its weight of water, and the chamber D is filled with common pure water. The partition $g$ bears, about eighteen inches from the bottom of the vessel, the pipe $h$. One end of the same goes in the water nearly to the bottom of the vessel. The cover of the vessel, which is made tight and fixed in the walls of the vessel in the manner above mentioned, contains the leading pipe $c\,c$, the manometer or gage $b$ for the chamber D, and the stuffing-box $a$ for the chamber C. The rod K is connected with the leaden jar or flask $f$. This jar has many small holes for the purpose that the liquid may go into the jar. The rod inside the vessel is made of lead, about twelve inches long. The other part is made of steel or iron and well turned and polished. The jar is about six inches long and three and one-half inches in diameter. The stuffing-box can easily be screwed off, and the rod, with the jar, can thus be taken out of the vessel. The pipe $c\,c$ is connected with the beer-vessel B. It goes through the bung of the same into the liquid. The end of this pipe, which comes in contact with the beer or liquid, must be of glass or of iron. Copper, lead, &c., will produce poisonous effects.

As soon as the operation shall go on I screw off the stuffing-box, fill the leaden jar with pieces of marble, (or other carbonates,) screw the stuffing-box on tightly, and press the rod down with the hand. The acid streams through the holes into the jar and comes in contact with the carbonate. The consequence of this is that carbonic acid is quickly set free, which gas can only move through the pipe $h$ in and through the water of chamber D, and becomes here washed. The manometer or gage $b$ shows the pressure of the gas. At first I open the cock or joint $d$ and let stream out the air and some gas. I then close the same. As soon as the gage shows a pressure of sixty pounds per square inch I prefer to lift up the rod K, and fasten the same, when necessary, with the spring $i$. The consequence of this is that the jar $f$ will remain out of the liquid acid, and the production of more carbonic acid will soon stop.

If any pressure or more refreshing taste of the beer is needed, it is only necessary to open the joint $d$ and let the carbonic-acid gas stream into the beer-vessel and the liquid as long as pressure or taste requires.

The gage shows when it is time to lift the jar out of the liquid acid and inverse.

It will be seen that this operation is very simple and easily done, and the production of carbonic-acid gas can thus be controlled to perfection. It can be done without more expense than the cost of muriatic or sulphuric acid and its equivalent of marble, &c., and by persons entirely unacquainted with machinery. In this way no explosion will take place; but to overcome the greatest carelessness it will be good to screw a common safety-valve on the cover of the vessel, which will let the gas escape by a certain expansion—say one hundred pounds on the square inch. The vessel described will resist a pressure of more than one hundred and fifty pounds on the square inch.

The effect of my arrangement is such that any person may produce any desired quantity of carbonic-acid gas. It will therefore not be necessary to buy this compressed gas. A considerable amount of money is therefore saved.

I will state here that a similar apparatus, like the so-called "Doebereiner's platinum lamp," can be used for the production of carbonic-acid gas for the purpose mentioned; but I prefer the arrrangement described. It is cheaper, as I have proved.

Having now fully described my invention, I wish it distinctly understood that I do not claim the application of carbonic-acid gas for preserving beer in general; but

What I claim as new, and desire to secure by Letters Patent, is—

The improved arrangement for the application of carbonic-acid gas in the manner as described, and for the purpose set forth.

FREDERIC M. RUSCHHAUPT.

Witnesses:
L. PITKIN,
C. PETERS.